US011295072B2

(12) United States Patent
Sundar et al.

(10) Patent No.: US 11,295,072 B2
(45) Date of Patent: Apr. 5, 2022

(54) AUTOFORM FILLING USING TEXT FROM OPTICAL CHARACTER RECOGNITION AND METADATA FOR DOCUMENT TYPES

(71) Applicant: ADP, LLC, Roseland, NJ (US)

(72) Inventors: Aravind Sundar, Bristol (GB); Daniel Derham, Bristol (GB)

(73) Assignee: ADP, LLC, Roseland, NJ (US)

( * ) Notice: Subject to any disclaimer, the term of this patent is extended or adjusted under 35 U.S.C. 154(b) by 126 days.

(21) Appl. No.: 16/429,561

(22) Filed: Jun. 3, 2019

(65) Prior Publication Data

US 2020/0380071 A1 Dec. 3, 2020

(51) Int. Cl.
| | |
|---|---|
| *G06F 40/174* | (2020.01) |
| *G06F 3/0482* | (2013.01) |
| *G06F 40/284* | (2020.01) |
| *G06Q 40/00* | (2012.01) |
| *G06K 9/00* | (2006.01) |
| *G06F 3/0483* | (2013.01) |
| *G06F 40/40* | (2020.01) |

(52) U.S. Cl.
CPC .......... *G06F 40/174* (2020.01); *G06F 3/0482* (2013.01); *G06F 3/0483* (2013.01); *G06F 40/284* (2020.01); *G06F 40/40* (2020.01); *G06K 9/00449* (2013.01); *G06K 2209/01* (2013.01); *G06Q 40/123* (2013.12)

(58) Field of Classification Search
None
See application file for complete search history.

(56) References Cited

U.S. PATENT DOCUMENTS

| | | | |
|---|---|---|---|
| 7,305,129 B2 | 12/2007 | Chellapilla et al. | |
| 7,849,398 B2 | 12/2010 | Dabet et al. | |
| 8,352,549 B2* | 1/2013 | Sacco | H04L 67/10 |
| | | | 709/204 |
| 9,058,515 B1* | 6/2015 | Amtrup | G06Q 10/10 |
| 9,058,580 B1* | 6/2015 | Amtrup | H04N 1/387 |
| 9,317,484 B1* | 4/2016 | Ho | G06F 40/226 |
| 9,412,017 B1* | 8/2016 | Huang | G06T 7/70 |
| 9,430,453 B1* | 8/2016 | Ho | G06K 9/00456 |
| 9,785,627 B2 | 10/2017 | Campanelli et al. | |
| 10,096,064 B2 | 10/2018 | Vroom et al. | |
| 10,198,774 B1* | 2/2019 | Wang | G06Q 40/123 |
| 10,318,756 B2* | 6/2019 | O'Brien | G06F 16/93 |
| 10,783,325 B1* | 9/2020 | Hecht | G06F 3/0483 |

(Continued)

OTHER PUBLICATIONS

WEBCON Publisher, "Custom OCR fields," WEBCON BPS Knowledge Base, Apr. 8, 2016, accessed May 14, 2019, 15 pages. http://howto.webcon.com/custom-ocr-fields/.

*Primary Examiner* — Benjamin Smith
(74) *Attorney, Agent, or Firm* — Yee & Associates, P.C.

(57) ABSTRACT

A method, apparatus, system, and computer program product for processing a form. A form processing system comprising a computer system and a form manager. The form manager is located in the computer system, wherein the form manager receives a selection of a form from a client application in the computer system; fills a set of fields in the form to form a filled form using text obtained from optical character recognition performed on an image of a document using metadata that defines a relationship between the set of fields in the form and text for a document type of the document; and sends the filled form to the client application in the computer system.

29 Claims, 13 Drawing Sheets

(56) References Cited

U.S. PATENT DOCUMENTS

| | | | |
|---|---|---|---|
| 10,803,527 B1* | 10/2020 | Zankat | G06K 9/00832 |
| 2006/0101051 A1* | 5/2006 | Carr | G06F 40/174 |
| 2007/0094296 A1* | 4/2007 | Peters, III | G06Q 10/10 |
| 2008/0040259 A1* | 2/2008 | Snow | G06Q 40/025 |
| | | | 705/38 |
| 2008/0098292 A1* | 4/2008 | Embry | G06F 40/174 |
| | | | 715/226 |
| 2009/0089372 A1* | 4/2009 | Sacco | G06F 16/958 |
| | | | 709/204 |
| 2009/0089678 A1* | 4/2009 | Sacco | G06F 16/958 |
| | | | 715/733 |
| 2010/0161460 A1* | 6/2010 | Vroom | G06Q 40/123 |
| | | | 705/31 |
| 2012/0063684 A1* | 3/2012 | Denoue | G06K 9/2072 |
| | | | 382/175 |
| 2013/0036347 A1* | 2/2013 | Eftekhari | G06Q 10/00 |
| | | | 715/222 |
| 2013/0096938 A1* | 4/2013 | Stueckemann | G16H 15/00 |
| | | | 705/2 |
| 2013/0297353 A1 | 11/2013 | Strange et al. | |
| 2014/0180705 A1* | 6/2014 | Stueckemann | G16Z 99/00 |
| | | | 705/2 |
| 2014/0244455 A1* | 8/2014 | Huang | G06T 7/00 |
| | | | 705/31 |
| 2014/0324648 A1* | 10/2014 | Mori | G06F 3/167 |
| | | | 705/31 |
| 2015/0078671 A1* | 3/2015 | van Deventer | G06K 9/00449 |
| | | | 382/217 |
| 2015/0170085 A1* | 6/2015 | Amtrup | G06Q 10/06316 |
| | | | 705/7.26 |
| 2015/0269433 A1* | 9/2015 | Amtrup | H04N 1/00106 |
| | | | 382/115 |
| 2015/0278474 A1* | 10/2015 | Stueckemann | G06Q 10/10 |
| | | | 705/2 |
| 2016/0104167 A1* | 4/2016 | Vanko | G06Q 40/025 |
| | | | 705/317 |
| 2016/0179313 A1* | 6/2016 | Ho | G06F 3/0483 |
| | | | 715/776 |
| 2016/0342752 A1* | 11/2016 | Stueckemann | G16H 20/10 |
| 2017/0006114 A1* | 1/2017 | Mande | G07F 19/211 |
| 2017/0103230 A1* | 4/2017 | O'Brien | G06F 16/93 |
| 2018/0244098 A1* | 8/2018 | Harada | B41M 3/14 |
| 2018/0342018 A1* | 11/2018 | Pancholi | G06F 3/0482 |
| 2018/0345129 A1* | 12/2018 | Rathod | G06T 19/003 |
| 2018/0349703 A1* | 12/2018 | Rathod | G06Q 20/047 |
| 2018/0350144 A1* | 12/2018 | Rathod | A63F 13/216 |
| 2019/0004773 A1* | 1/2019 | Hoberman | G06F 3/04847 |
| 2019/0096018 A1* | 3/2019 | Stueckemann | G16H 20/10 |
| 2019/0188464 A1* | 6/2019 | Nepomniachtchi | G06K 9/00456 |
| 2019/0258707 A1* | 8/2019 | Terra | G06N 20/00 |
| 2019/0267123 A1* | 8/2019 | Stueckemann | G16H 20/10 |
| 2020/0143078 A1* | 5/2020 | O'Brien | G06F 16/93 |
| 2020/0348809 A1* | 11/2020 | Drescher | G06K 9/00469 |

\* cited by examiner

Form Designer

Layout | Behaviour | File | Edit

English (United Kingdom) ▼

Data

HR net User Data ▼

Add Dependent

[Section]

[Column]

This form allows you to add dependant details. The details will be sent to your HR administrator for approval.

Drag on a field or click for more options.

708

| Item Properties | |
|---|---|
| Form | |
| Owner | NG HR (Core) |
| Caption | Add Dependent |
| Description | Request a change of D... |
| Save Message | Your request has been ... |
| Main Data View | |
| Input Parameters | (Input Parameters) |
| Label Width | Medium |
| Application Types | (Application Types) |
| Screen Group | |
| Read Only | False |
| Class | |
| Category | NA |
| Actions | |
| Allow Insert | True |
| Allow Delete | True |
| Allow Save | True |
| Delete Action | |
| Save Action | |
| Allow Save as Draft | True |
| Has Last Modified | True |
| Has Mail Merge | False |
| Has Attached Documents | False |
| Show Action Button | True |
| Navigation | |
| Secondary Navigation | |
| Allow Grouping | False |

Dependent

[Column]

Name
Relationship
Gender
Marital status
Date of birth
Date of death
Date of adoption
Is disabled?
Disability percentage

702

706

Drag on a field or click for more options.

Contact Details

[Column]

Home telephone
Mobile telephone
Work telephone
OCR Driving License

704

Drag on a field or click for more options.

Click to add a new section ...

Add Dependant                                                          ✕

Dependant

Name *
[                                              ]

Relationship *
[                                           ▼ ]

Gender
[                                           ▼ ]

Date of birth
[ DD/MM/YYYY        🗓 ]

Date of adoption
[ DD/MM/YYYY        🗓 ]

☐ Is disabled?

Contact Details

Home telephone
[                                              ]

Mobile telephone
[                                              ]

Work telephone
[                                              ]

OCR Driving License

[ No Image ]

[ 🅐 UPLOAD ]   [ CLEAR ]
[ SUBMIT ]      [ CANCEL ]

FIG. 9

AUTOFORM FILLING USING TEXT FROM OPTICAL CHARACTER RECOGNITION AND METADATA FOR DOCUMENT TYPES

BACKGROUND INFORMATION

1. Field

The present disclosure is directed to an improved computer system and, in particular, to a form management system using optical character recognition. Still more particularly, the present disclosure relates to a method, apparatus, system, and computer program product for automatically filling fields in a form with information obtained from optical character recognition processing of a document having a document type in which the fields are automatically filled in the form using metadata describing a relation of fields in the form to the information in the document having the document type.

2. Background

Organizations employ forms for many processes. For example, when an employee adds a dependent for health insurance the employee fills out a form that has fields for information needed to add a dependent. If the employee moves to a new residence, the employee will fill out an address update form. Forms are used for almost any addition, change, or update to information for an employee. The employee fills out yet another form to change with tax holdings or 401k withholdings.

In a similar fashion, a bank customer will also fill out forms for various requests. For example, the bank customer fills out one form to change beneficiaries. The bank customer fills out another form to change who is authorized to perform transfer of funds in a checking or savings account.

These forms are often filled by a user in an online environment. A graphical user interface such as a browser can display forms with fields that the user fills with information needed. After the form is completed, the completed form is submitted and processing of the information continues. The filling of these forms can be time-consuming and tedious for user.

Therefore, it would be desirable to have a method and apparatus that take into account at least some of the issues discussed above, as well as other possible issues. For example, it would be desirable to have a method and apparatus that overcome a technical problem with reducing the time and tediousness of form filling for users.

SUMMARY

An embodiment of the present disclosure provides a form processing system comprising a computer system, a policy, and a form manager. The form database is in the computer system and includes forms with fields. The policy includes maps that comprise mapping metadata defining relationships between the fields in forms and text from documents based on document types for the documents. The form manager is in the computer system and receives a selection of a form in the form database from a client device over a network and receives an image of a document, wherein the document has a document type. The form manager sends the image of the document to an optical character recognition engine and receives text from the optical character recognition engine. The form manager stores the text in a data structure based on the document type for the document. The form manager fills a set of the fields in the form using selected text from the text stored in the data structure using a map in the maps that defines a relationship between the set of the fields in the form and the text to create a filled form using the map. The form manager sends the filled form to the client device over the network.

Another embodiment of the present disclosure provides a form processing system comprising a computer system and a form manager. The form manager is located in the computer system, wherein the form manager receives a selection of a form from a client application in the computer system; fills a set of fields in the form to form a filled form using text obtained from optical character recognition performed on an image of a document using metadata that defines a relationship between the set of fields in the form and text for a document type of the document; and sends the filled form to the client application in the computer system.

Yet another embodiment of the present disclosure provides a method for processing a form. The form is identified for processing. Text is obtained from optical character recognition performed on an image of a document. A document type is identified for the document. A policy with metadata defining a mapping between the text from the document having the document type and fields in the form is identified. A set of the fields in the form is filled using the text to form a filled form. The filled form is sent to a client device.

Still another embodiment of the present disclosure provides a method for processing a form. A selection of a form is received from a client application in a computer system. A set of fields in the form is filled using text obtained from optical character recognition performed on an image of a document using metadata that defines a relationship between a set of fields in the form and the text for the document having the document type. The filled form is sent to the client application in the computer system.

Another embodiment of the present disclosure provides a computer program product for processing a form. The computer program product comprises a computer-readable storage media and first program code, second program code, third program code, fourth program code, fifth program code, and sixth program code stored in the computer-readable storage media. The first program code identifies the form for processing. The second program code is executed to obtain text from optical character recognition performed on an image of a document. The third program code is executed to identify a document type for the document. The fourth program code is executed to identify a policy with metadata defining a mapping between the text from the document, having the document type and a set of fields in the form. The fifth program code is executed to fill the set of fields in the form using the text to form a filled form. The sixth program code is executed to send the filled form to a client device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a form creation page in accordance with an illustrative embodiment;

FIG. 9 is an illustration of a form in accordance with an illustrative embodiment;

DETAILED DESCRIPTION

Figure 1:
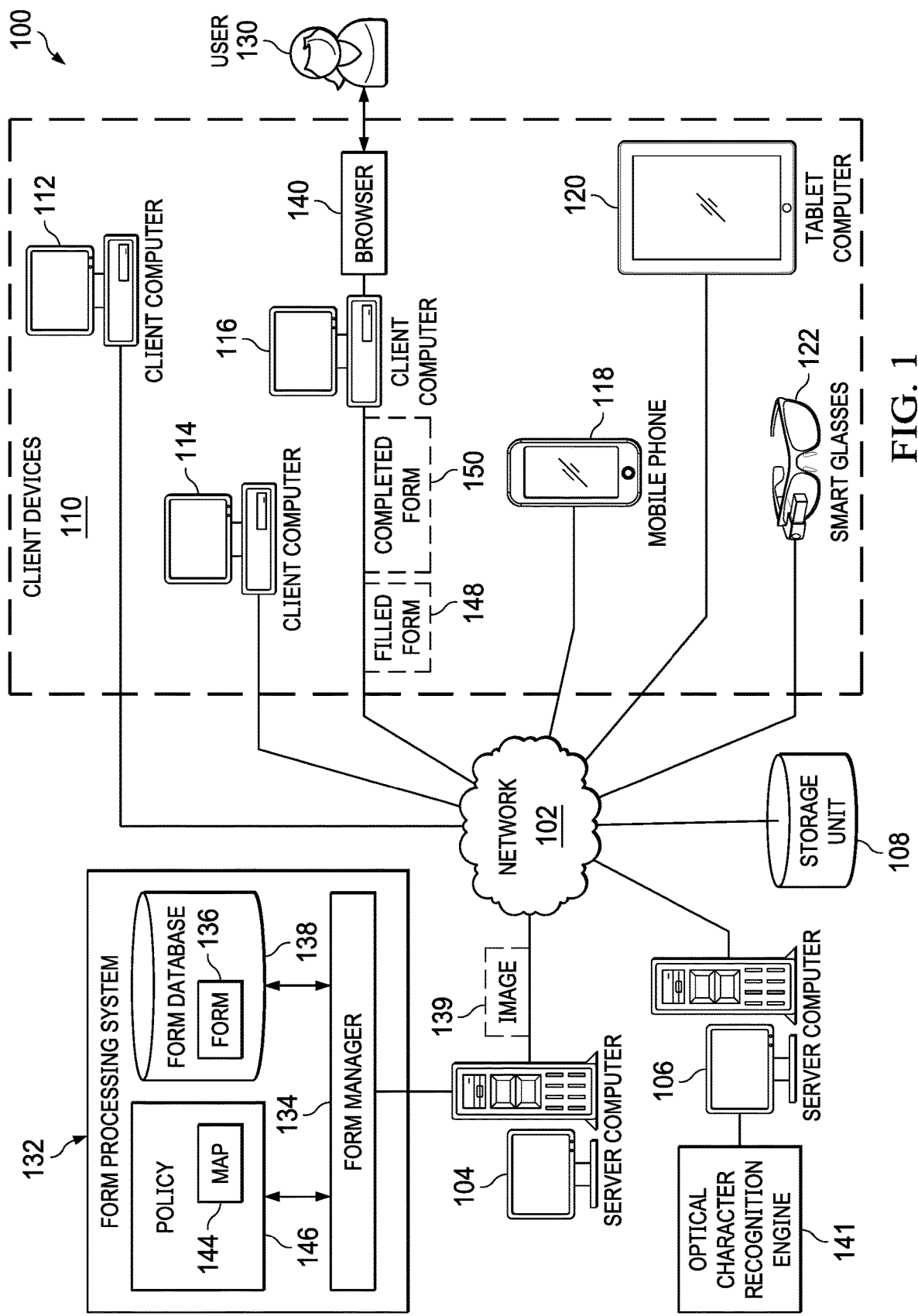
FIG. 1 is a pictorial representation of a network of data processing systems in which illustrative embodiments may be implemented.

The illustrative embodiments recognize and take into account one or more different considerations. Those embodiments recognize and take into account that documents can be supplied by a user that are processed through an optical character recognition process to obtain text. The illustrative embodiments recognize and take into account that this text can be used to fill forms. For example, the illustrative embodiments recognize and take into account that a user can copy and paste the text into fields in the form. The illustrative embodiments recognize and take into account that this process can reduce the time and effort needed for a user to fill a form.

The illustrative embodiments recognize and take into account that it would be desirable to have a method, apparatus, system, and program code that auto-populates fields in forms using text generated from optical character recognition processing of documents. The illustrative embodiments also recognize and take into account that it would be desirable to have an auto system that does not involve writing code for each type of document in each type of document and each type of form.

Thus, the illustrative embodiments provide a method, apparatus, and system for processing forms. In one illustrative example, a method processes a form. The method identifies the form for processing and obtains text for a document from optical character recognition performed on an image of the document. The method identifies a document type for the document. The method identifies a policy with metadata defining a mapping between the text from the document having the document type and fields in the form. The process fills a set of fields in the form using selected text from the text and sends the filled form to a client device.

As used herein, "a set of" when used with reference to items, means one or more items. For example, "a set of fields" is one or more fields.

The present disclosure avoids having to define where data in each document goes in a particular form through hard coding where the data from a particular type of document goes in a particular type of form. The present disclosure uses metadata to describe relationships between information in different types of documents with a form. The relationship can be defined through a selection of mappings of information obtained from the document with the fields in the form.

In the illustrative examples, a resolver in a form manager can be used to obtain information from a type of document. The resolver defines the type of document that is processed by the resolver, such as a driver's license, a passport, an expense report, an employment application, or some other type of form. The resolver defines what information obtained from performing optical character recognition on the document will be available.

For example, the driver license can have a first name, last name, driver license number, address, date of birth, gender, eye color, hair color, height, and expiration date. The resolver can define what information from performing optical character recognition is output. For example, the resolver can be defined to output the first name, last name, date of birth, and address. This information is saved in a data structure such as a flat file, a linked list, a JavaScript Object Notation object, or other suitable data structure.

In the illustrative examples, maps are defined for each form and document type that may be used. A map is metadata that defines the relationship between a selected form and a particular document type. The metadata states what piece of information in a data structure generated by a resolver goes into a particular field in the form. The maps can be easily changed when a form changes. New forms can be easily added by creating new maps.

The form manager sends the form for display to a user at a client device in which a set of fields in the form is automatically filled. This display involves a mapper in the form manager receiving a selection of a form and an image of a document from a browser running on the client device for the user. The resolver in the form manager sends the image to an optical character recognition engine for the document type of the document. The text is received by the resolver from the optical character recognition engine. The resolver formats desired portions of the text into a format for use in filling the form and places the desired portions of the text into a data structure.

The mapper in the form manager uses text in the data structure and a map for the document type to automatically fill a set of fields in the form. The map has metadata defining the relationships between fields, the form, and text that is available for a particular document type in the data structure. The set of fields are for some or all of the fields in the form.

The mapper in the document manager sends the form with the set of fields that have been automatically filled with the text to the browser running on the client device for the user. The browser displays the form with the set of fields that has been automatically filled with the text. The user can verify and correct text in filled fields and enter text in any blank fields.

When the user is finished, the completed form is returned to the form manager for further processing. The processing can include at least one of adding text, reading text, deleting text, modifying text, or other suitable operations, actions, or steps that use the text filled in the completed form.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 130 desires to perform an operation or task that requires the filling of a form. For example, user 130 can make a request to update or enter information. In another example, user 130 can select a form to fill to initiate processing of information such as generating a report or spreadsheet.

As depicted, form processing system 132 runs on server computer 104. Form manager 134 in form processing system 132 receives a selection of form 136 in form database 138 from a client device over network 102. In this depicted example, the client device is client computer 116 operated by user 130.

As depicted, form manager 134 also receives image 139 for a document adding a particular document type. As depicted, image 139 is uploaded to server computer 104 from client computer 116. As depicted, the uploading of image 139 can be performed by user 130 operating browser 140 running on client computer 116. Browser 140 is program code used to access information on a network.

In this illustrative example, browser 140 can be a software application or a module in a software application that accesses information through network 102. This information may be located on the World Wide Web. For example, browser 140 can be used to retrieve information such as a webpage, an image, a video, electronic mail, or other information. Browser 140 displays the information on a display device in client computer 116.

Browser 140 can be an application such as Chrome, Firefox, Internet Explorer, or other available browsers. In other illustrative examples, browser 140 can be implemented as part of a software application such as a human resources application, and accounting application, or some other software application.

In this illustrative example, form manager 134 sends image 139 to optical character recognition engine 141. Optical character recognition engine 141 runs on server computer 106 and is a software application that converts images of typed, handwritten, or printed text into machine encoded text. Image 139 can be a scanned document, a photograph of the document, a photograph of a scene, or other types of images that contain text for recognition.

In this illustrative example, optical character recognition engine 141 returns text 142 to form manager 134. Text 142 returned by optical character recognition engine 141 can also be referred to as raw text.

Form manager 134 fills a set of fields in form 136 using selected text from text 142. The set of fields are filled using map 144 in policy 146. Policy 126 is one or more rules and may include data used to apply the rules. In this illustrative example, map 144 contains a rule and mapping metadata for filling form 136 using text 142. The mapping metadata in map 144 defines the relationship between the fields in form 136 and text 142. Not all of text 142 may be used to fill fields in form 136 or other forms.

The relationship is defined for form 136 and a particular document type for the document in image 139. For example, the particular document type of the document in image 139 can be a driver license, a passport, a social security card, a birth certificate, an expense report, an employment application, a Form W-2 and other suitable types of document.

As depicted, form manager 134 sends filled form 148 to client computer 116 over network 102. Browser 140 displays filled form 148 to user 130.

User 130 may verify whether fields filled with text in filled form 148 are correct. User 130 can make changes, enter text into fields that are not filled in filled form 148, or some combination thereof. When completed, user 130 can return completed form 150 to form manager 134 over network 102. The information in completed form 150 can then be used to perform various operations and tasks.

Thus, forms can be filled by form processing system 132. This form processing system can automatically fill forms with text obtained from optical character recognition performed on an image of a document. The filling of forms with the text is performed using maps containing metadata that describe a mapping or relationship between a type of document from which text is available for form filling and fields in the forms.

The illustration of form processing in FIG. 1 is an illustration of one manner in which an illustrative example can be implemented. For example, form manager 134 can be located on client computer 116 with browser 140. In another illustrative example, optical character recognition engine 141 can be located on server computer 104.

Figure 2:
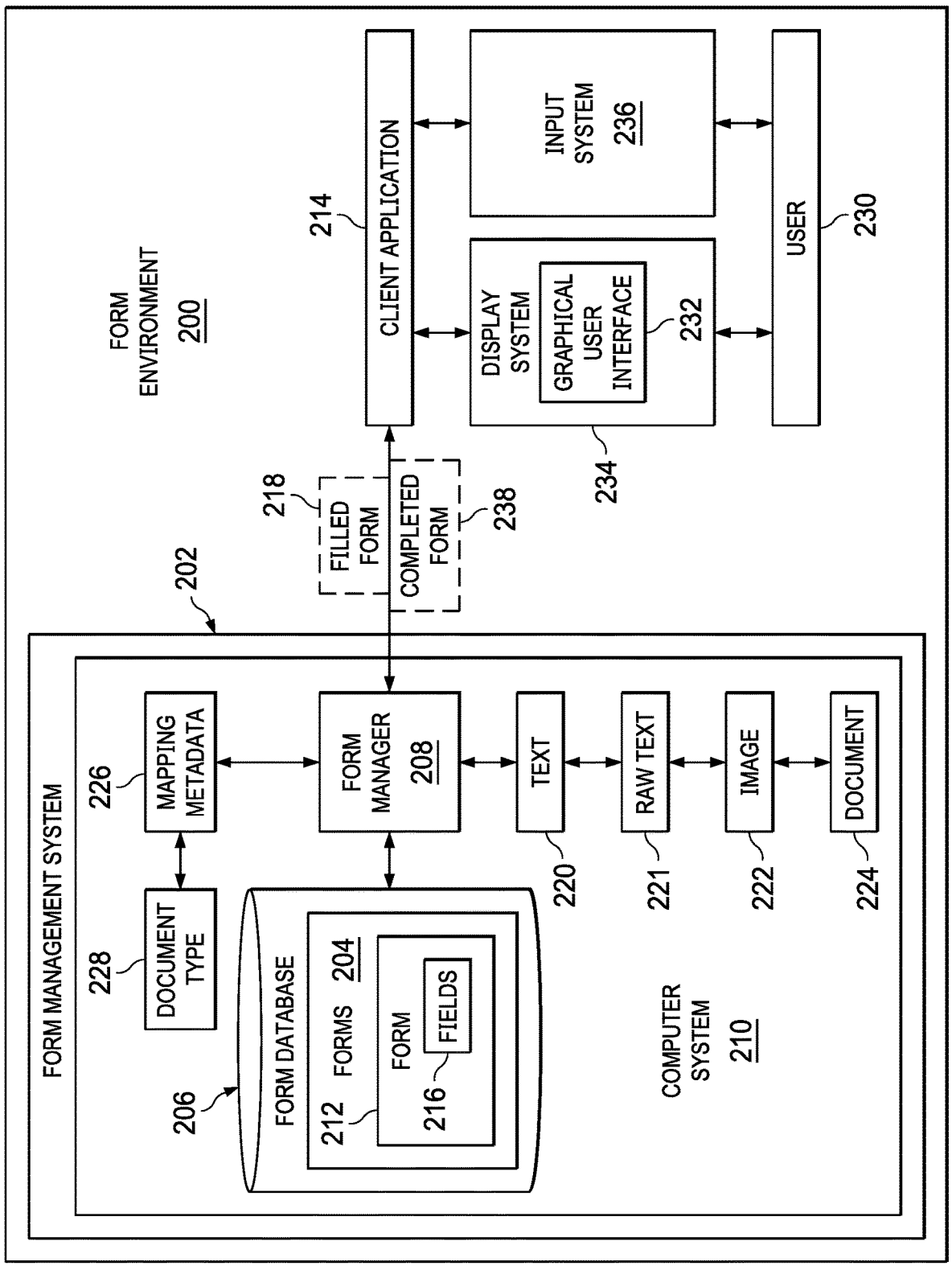
FIG. 2 is a block diagram of a form environment in accordance with an illustrative embodiment.

With reference now to FIG. 2, a block diagram of a form environment is depicted in accordance with an illustrative embodiment. In this illustrative example, form environment 200 includes components that can be implemented in hardware such as the hardware shown in network data processing system 100 in FIG. 1.

In this illustrative example, form management system 202 in form environment 200 can operate to process forms 204. As depicted, forms 204 are stored in form database 206. In the illustrative example, a database is an organized collection of information that is stored and accessed by computing devices such as a server, a work station, a laptop, a mobile phone, or some other suitable type of device. In some cases, a database may also include database management software that is used to interact with end-users and applications to access the collection of information.

In this illustrative example, form management system 202 includes form manager 208 in computer system 210. Form manager 208 operates to process forms 204.

Form manager 208 can be implemented in software, hardware, firmware or a combination thereof. When software is used, the operations performed by form manager 208 can be implemented in program code configured to run on hardware, such as a processor unit. When firmware is used, the operations performed by form manager 208 can be implemented in program code and data and stored in persistent memory to run on a processor unit. When hardware is employed, the hardware may include circuits that operate to perform the operations in form manager 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium may be a network. The data processing systems may be selected from at least one of a computer, a server computer, a tablet, or some other suitable data processing system.

In this illustrative example, form manager 208 in computer system 210 receives a selection of form 212 from client application 214 in computer system 210. Form manager 208 fills a set of fields 216 in form 212 to form filled form 218 using text 220 obtained from optical character recognition performed on an image 222 of document 224 using mapping metadata 226.

In this example, text 220 can be all or a subset of raw text 221 received from optical character recognition performed on an image 222. Text 220 is the portion of raw text 221 that may be mapped to fields in form 212. As depicted, text 220 is from the portion or subset of raw text 221. In some cases, text 220 can be all of raw text 221.

The set of fields 216 can be a portion or all of fields 216 in form 212. In other words, unfilled fields can be present in fields 216 when text 220 is not mapped to all of fields 216.

In this example, mapping metadata 226 defines the relationship between the set of fields 216 in form 212 and text 220 for document type 228 of document 224. Form manager 208 sends filled form 218 to client application 214 in computer system 210.

In this example, filled form 218 can be displayed to the user 230 on graphical user interface 232 displayed on display system 234 for computer system 210. User 230 interacts with filled form 218 using input system 236. This interaction includes at least one of confirming the set of fields 216 filled by form manager 208, correcting one or more of the set of fields 216, or entering information into other fields in fields 216 which have not been filled by form manager 208.

When user 230 has completed interacting with filled form 218, filled form 218 is returned to form manager 208 as completed form 238. The information completed in completed form 238 can then be used to perform various operations, tasks, or other processes.

Figure 3:
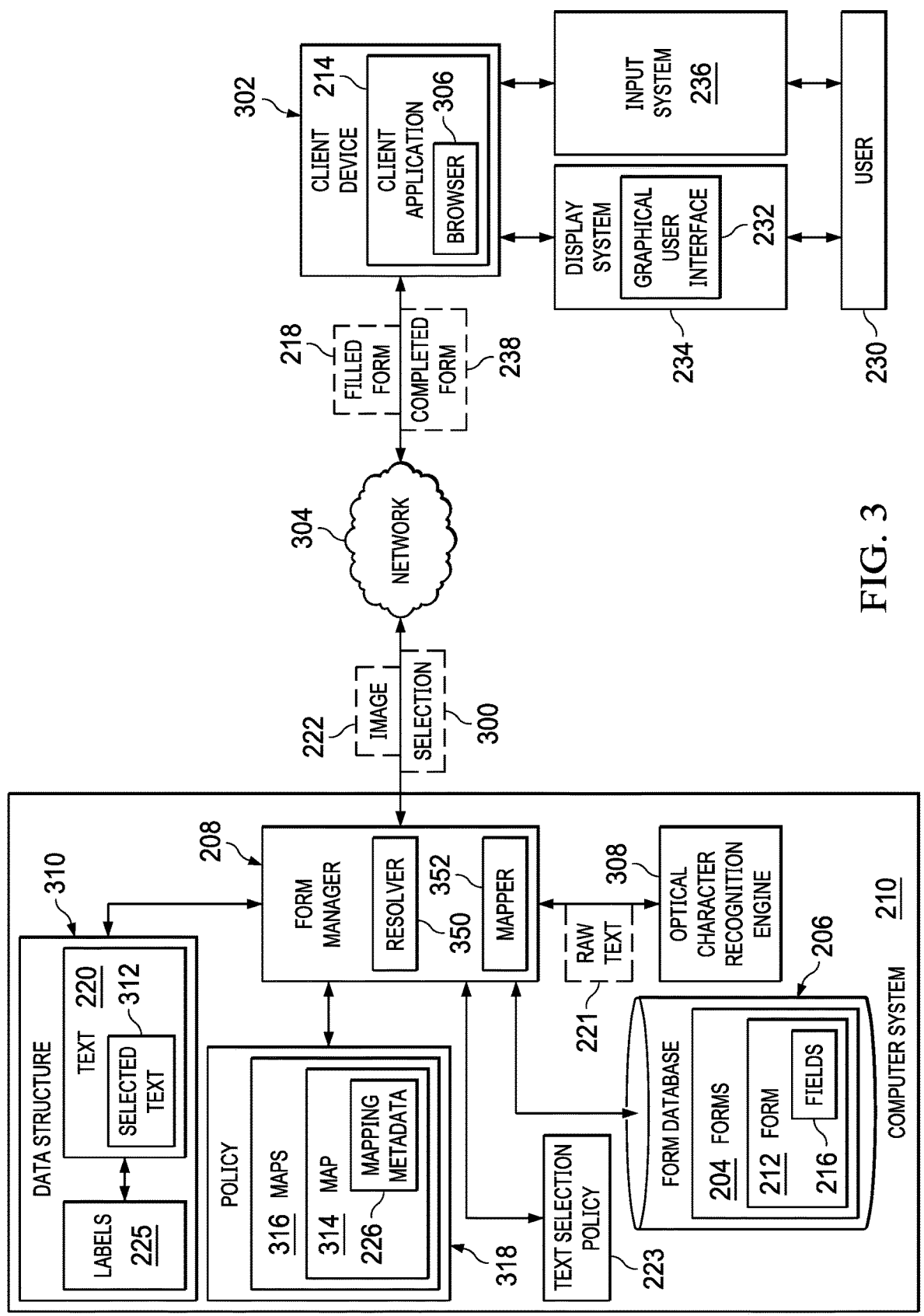
FIG. 3 is diagram of dataflow for processing a form in accordance with an illustrative embodiment.

With reference next to FIG. 3, an illustration of dataflow for processing a form is depicted in accordance with an illustrative embodiment. In the illustrative examples, the same reference numeral may be used in more than one figure. This reuse of a reference numeral in different figures represents the same element in the different figures.

In this illustrative example, resolver 350 in form manager 208 stores text from documents in data structures based on the document types for the documents. The text from the documents is obtained from optical character recognition processing of images of the documents in this example.

The dataflow for processing of form 212 in this illustrative example includes resolver 350 in form manager 208 receiving selection 300 of form 212 in form database 206 from client application 214 in client device 302 over network 304. In this illustrative example, client application 214 takes the form of browser 306.

As depicted in this example, resolver 350 in form manager 208 also receives image 222 of document 224. As depicted, image 222 can be uploaded from client application 214 in client device 302. In this example, user 230 can upload image 222 of document 224 using client application 214.

Resolver 350 in form manager 208 sends image 222 to optical character recognition engine 308 in computer system 210 and receives raw text 221 from optical character recognition engine 308. Image 222 can be sending a link, pointer, or universal resource locator of image 222 or sending a file with image 222.

In this illustrative example, optical character recognition engine 308 is located in computer system 210. This component can be located on the same or a different computing device in computer system 210. In yet other examples, optical character recognition engine 308 can be considered a component outside of computer system 210 that is connected to network 304.

In this illustrative example, resolver 350 in form manager identifies text 220 from raw text 221 received from optical character recognition engine 308. Resolver 350 is configured to search raw text 221 for text 220 to be stored in data structure 310 for use in filling forms 204. In this illustrative example, based on the document type, resolver 350 can use mappings to identify text 220 that is needed from raw text 221.

For example, the identification of text 220 can be made based on text selection policy 223. As depicted, text selection policy 223 contains one or more rules that define what text is needed from raw text 221. Text selection policy 223 can identify text 220 based on document types for the documents in images. Each set of rules in text selection policy 223 can be used to identify text from raw text for a particular document type.

For example, resolver 350 has a set of rules in text selection policy 223 for a particular document types to know where text 220 in raw text 221 is located in raw text 221 output from the optical character recognition engine 308. For example, resolver 350 may look for the portion of raw text 221 that will be associated with a label "name" in data structure 310. In this example, a rule for a "name" can be raw text 221 found in a particular bounding box. As another illustrative example, the rule can be a "name" is located after "2" in raw text 221 output from optical character recognition engine 308.

Resolver 350 stores text 220 in data structure 310 based on document type 228 of document 224. Text 220 is stored in association with labels 225. Each label in labels 225 is associated with a portion of text 220. As depicted, labels 225 can be used in mapping metadata 226 to map text 220 associated with labels 225 to fields in forms 204.

Data structure 310 can take a number of different forms. For example, data structure 310 can be one of a JavaScript Object Notation object, a table, a database, a flat file, a linked list, and other types of data structures.

As depicted, mapper 352 in form manager 208 fills a set of fields 216 in form 212 using text 220 stored in data structure 310 using map 314 in maps 316 in policy 318. In this depicted example, maps 316 define what text is used to fill in the fields in forms 204.

For example, mapping metadata 226 in map 314 defines the relationship between the set of fields 216 in the form and text 220. In other words, map 314 defines what portions of text 220 are placed into fields 216. In this example, portions of text 220 are associated with labels 225 in data structure 310. As depicted, mapping metadata 226 is used by mapper 352 to fill the set of fields 216 to create filled form 218.

In this illustrative example, selected text 312 in text 220 is text 220 that is used to fill the set of fields 216. Selected text 312 can be some or all of text 220. In other words, some of text 220 may not be used for filling form 212 based on document 224 of document type 228.

This mapping of text 220 to the set of fields 216 using maps 316 can take into account that different document types include different text that may be used in different forms. In the illustrative example, policy 318 includes maps 316 that are used to map text from different document types to forms 204.

When text 220 is received by mapper 352, mapper 352 automatically fills form 212. In this illustrative example, mapper 352 obtains text 220 from data structure 310 and places text 220 into a set of fields 216 in form 212 based on the mapping defined by mapping metadata 226 in map 314. In other examples, text 220 could be used directly as received by resolver 350. The placement of text 220 is a selective placement in which only the portions of text 220 that are mapped to fields 216 are used in form 212. In other words, some of text 220 in data structure 310 may be unused when filling the set of fields 216 for form 212. The unused text may be used to fill fields in another form in forms 204.

In the illustrative example, user input is not needed to initiate the filling of form 212 or select what text is placed into which fields in form 212. Mapper 352 in form manager 208 sends filled form 218 to client device 302 over network 304 for display to user 230.

At client device 302, user 230 can perform actions on filled form 218 that include confirming filled form 218 is correct, adding text, or performing other actions with respect to filled form 218. When user 230 has completed performing actions on filled form 218, filled form 218 is returned as completed form 238 and is returned to form manager 208 for further processing.

Figure 4:
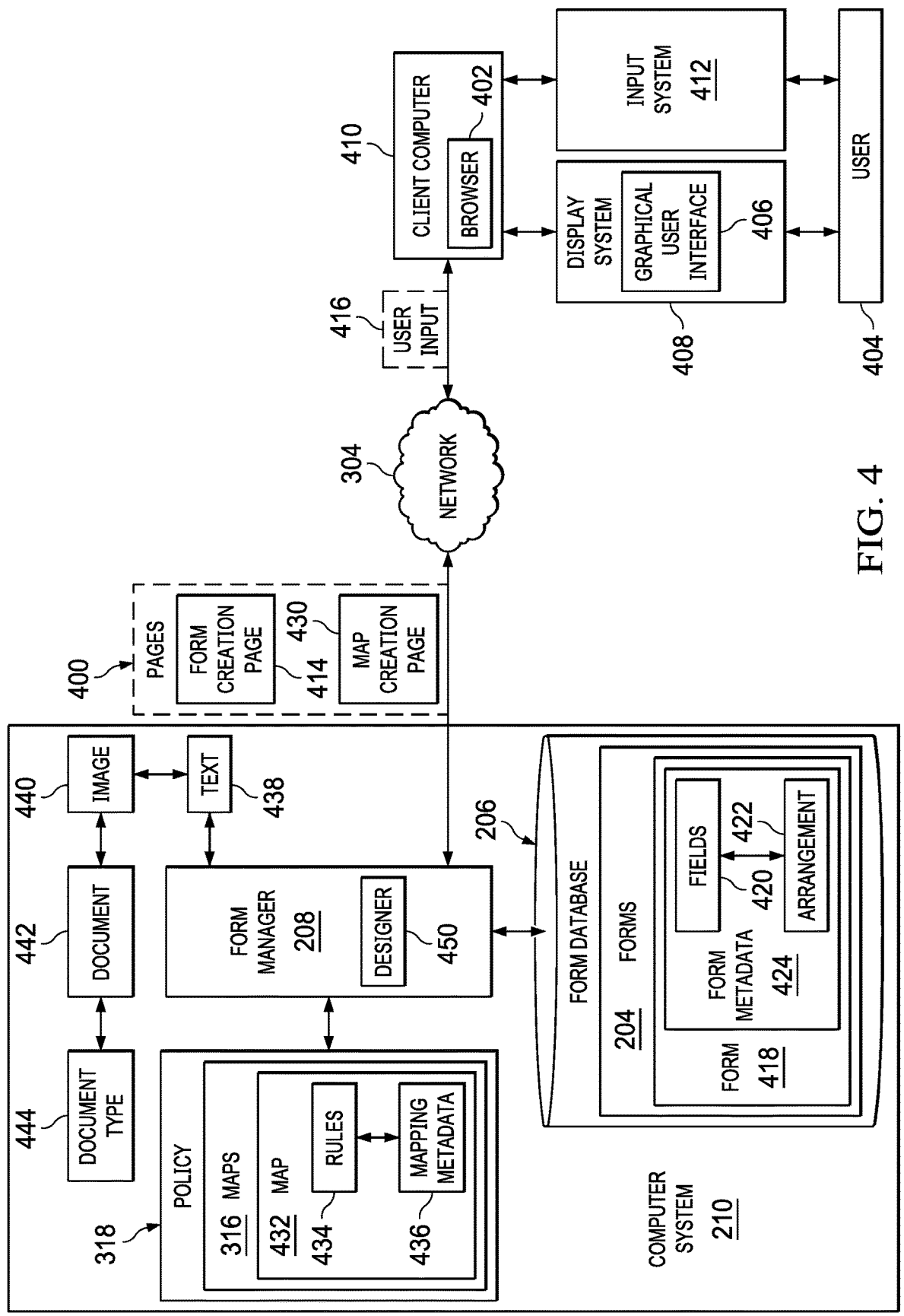
FIG. 4 is a diagram of dataflow in creating metadata for automatically filling forms in accordance with an illustrative embodiment.

With reference next to FIG. 4, a diagram of dataflow in creating metadata for automatically filling forms is depicted in accordance with an illustrative embodiment. As depicted, designer 450 operates to receives user input 416 defining fields 420 in form 418 and arrangement 422 of fields 420 and stores fields 420 and arrangement 422 of fields 420 as form metadata 424.

The dataflow in this creation of form metadata 424 includes designer 450 in form manager 208 sending pages 400 over network 304 to browser 402 running on client computer 410. As depicted, browser 402 displays pages 400 to user 404 in graphical user interface 406 on display system 408 for client computer 410.

In the illustrative example, user 404 interacts with graphical user interface 406 using input system 412 for client computer 410. In this illustrative example, user 404 is, for example, a developer, a form manager, or some other user that manages at least one of forms 204 in form database 206 or maps 316 in policy 318.

In this depicted example, the set of pages 400 includes form creation page 414. As depicted, user 404 can interact with form creation page 414 using input system 412 to generate user input 416 that defines form 418 in forms 204. User input 416 can select fields 420 that are in form 418. Further user input 416 can define arrangement 422 of fields 420 in form 418. These definitions are form metadata 424. When designer 450 receives user input 416 from client computer 410, form metadata 424 is stored for form 418 in forms 204 in form database 206.

Further, designer 450 can create mapping metadata 436 through receiving user input 416 selecting form 418, document type 444 of document 442, and a mapping between text for document 442 having document type 444 and a group of fields 420 in form 418 and stores the mapping between text 438 for document 442 having document type 444 and the set of fields 420 in form 418 as mapping metadata 436 in map 432 for document type 444. The mapping between text 438 for document 442 having document type 444 and the set of fields 420 in form 418 may only designate that some of text 438 is used to fill the set of fields 420. In other words, when the set of fields 420 is filled using text 438, only some of text 438 may be used in some instances. In other instances, the mapping can use all of text 438.

The dataflow in creating mapping metadata 436 includes sending map creation page 430 in pages 400 sent by designer 450 to browser 402 in client computer 410. As depicted, map creation page 430 is used by user 404 to create map 432 in maps 316 in policy 318.

In this illustrative example, map 432 comprises a set of rules 434 and mapping metadata 436. The set of rules 434 is one or more rules that define logic for mapping text 438 obtained from optical character recognition being performed on image 440 of document 442 having document type 444 to a set of fields 420 in form 418. Mapping metadata 436 is applied or used in the set of rules 434 to map text 438 to the set of fields 420 in form 418.

In the illustrative example, mapping metadata 436 defines the relationship between the set of fields 420 in form 418 and text 438. In other words, mapping metadata 436 provides values or information for parameters in the set of rules 434. As depicted, mapping metadata 436 defines a mapping between text 438 from document 442 having document type 444 and the set of fields 420 in form 418.

When user input 416 defining mapping metadata 436 is received by designer 450, map 432 with the set of rules 434 and mapping metadata 436 is stored in policy 318.

Figure 5:
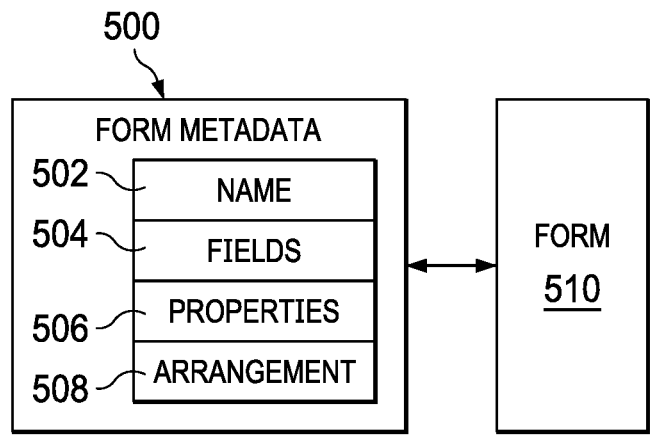
FIG. 5 is a block diagram of form metadata in accordance with an illustrative embodiment.

With reference now to FIG. 5, a block diagram of form metadata is depicted in accordance with an illustrative embodiment. This example, form metadata 500 is an example of one implementation for form metadata 424 in FIG. 4. In this illustrative example, form metadata 500 includes name 502, fields 504, properties 506, and arrangement 508. Form metadata 500 describes form 510, which is an example of the form in form database 206 in FIG. 2.

Name 502 is the name of the form. Fields 504 describes one or more fields that are present in form 510. Fields 504 includes fields in which text can be entered for form 510. In this illustrative example, properties 506 are properties for fields 504. Each field in fields 504 has one or more properties 506. Properties 506 can include at least one of a caption, a description, whether text can be pasted, whether text can be saved, whether a control should be displayed with the field, whether the field is read-only, input parameters, or other properties for fields 504.

Arrangement 508 defines the arrangement for fields 504. Arrangement 508 can describe a location for each field in form 510. For example, arrangement 508 can describe whether a field in fields 504 is located in a particular section, column, or other location in form 510.

Figure 6:
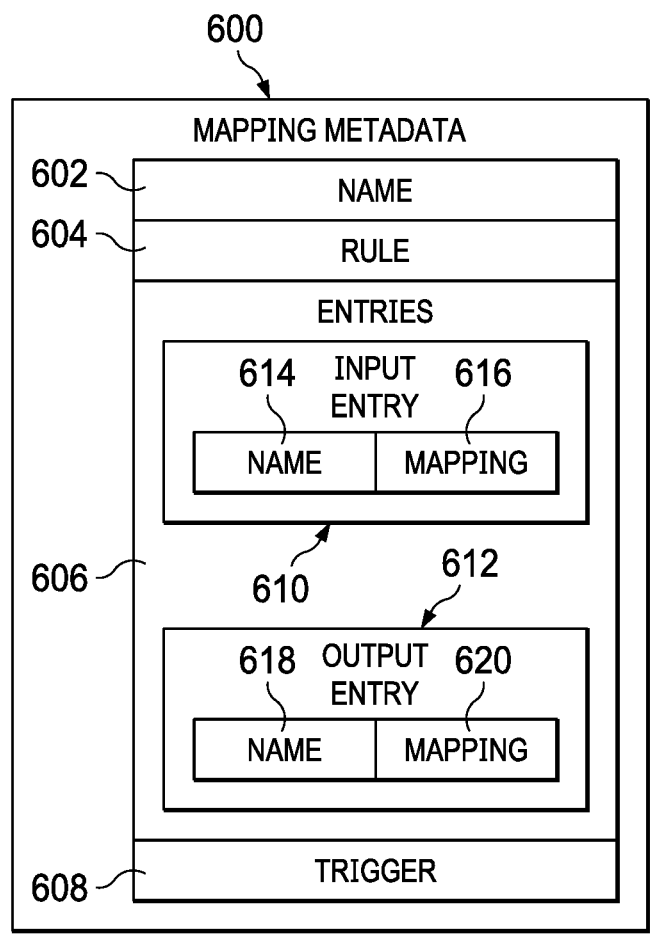
FIG. 6 is a block diagram of form metadata in accordance with an illustrative embodiment.

Turning next to FIG. 6, a block diagram of mapping metadata is depicted in accordance with an illustrative embodiment. In this illustrative example, mapping metadata 600 is an example of one implementation for mapping metadata 436 in FIG. 4.

As depicted, mapping metadata 600 comprises name 602, rule 604, entries 606, and trigger 608. In this illustrative example, entries 606 include input entry 610 and output entry 612.

Name 602 is the name of the document type in this example. As depicted, rule 604 is the logic in mapping metadata 600. In this example, rule 604 states that name 614 is mapped to mapping 616. Additionally, rule 604 also states that name 618 is mapped to mapping 620.

Input entry 610 describes information that is used in optical character recognition processing of an image of a document. As depicted, input entry 610 includes name 614 and mapping 616. Name 614 is the name of the entry and mapping 616 is where the input is found. For example, name 614 can be a field for a file name of an image and mapping 616 can be the location of the image. Input entry 610 can be used by a resolver to send an image to an optical recognition engine for processing.

Trigger 608 describes when the metadata is to be used to process an image or text. For example, trigger 608 can indicate that an image is to be sent for optical character recognition each time the image changes or a form is changed that uses text from a document having the document type.

As depicted, output entry 612 describes text that is returned from processing the image for the document using optical character recognition. As depicted, output entry 612 includes name 618 and mapping 620. In this illustrative example, name 618 is the name of the label that is associated with a piece of the text. For example, when the text is stored in a data structure, the text can be stored with labels. Mapping 620 is the name of the field in a form.

Name 618 is mapped to mapping 620. In other words, the text that is associated with name 618 is the text that is placed into the name of the field and mapping 620.

For example, name 618 is a label, such as "city," associated with a value, "paris". In this example, "paris" is the portion of the text obtained from optical character recognition of an image. Mapping 620 can be "city name\value" where "city name\value" is the name of the field in the form. As a result, a data structure for the document type containing "city" as a label can be mapped to "city name\value" in a form.

One input entry and one output entry are shown for entries 606 for purposes of illustrating types of entries that may be present. Actual mapping metadata can include multiple input entries in multiple output entries. For example, output entry is present for each piece of text that is to be mapped to a field in a form.

In one illustrative example, one or more technical solutions are present that overcome a technical problem with the time and effort needed to fill forms. As a result, the illustrative example provides one or more technical solutions with the technical effect of using optical character recognition of documents to automatically fill one or more fields in a form. The illustrative example provides one or more technical solutions with a technical effect in which metadata is used to define the mapping between a document type and a form. As a result, hard code mapping between the image and the form do not have to be performed. Currently, program code, using program languages such as C++, Java, or other program languages, is written to perform mapping for specific text to a specific field. One or more technical solutions provide a form manager that uses metadata and metadata mapping without the need to rewrite or write new program code for each form.

Computer system 210 can be configured to perform at least one of the steps, operations, or actions described in the different illustrative examples using software, hardware, firmware, or a combination thereof. As a result, computer system 210 operates as a special purpose computer system in which form manager 208 in computer system 210 enables processing forms in which forms can be automatically filled from text obtained through optical character recognition of images for documents based on the document types of the documents. In particular, form manager 208 transforms computer system 210 into a special purpose computer system as compared to currently available general computer systems that do not have form manager 208.

In the illustrative example, the use of form manager 208 in computer system 210 integrates processes into a practical application for method processing forms that increases the performance of computer system 210. In other words, form manager 208 in computer system 210 is directed to a practical application of processes integrated into form manager 208 in computer system 210 that identify the form for processing. The practical application of processes include obtaining text from optical character recognition performed on an image of the document, identifying a document type for the document, identifying a policy with metadata defining a mapping between the text from the document having the document type and fields in the form, filling a set of fields in the form using selected text from the text, and sending the filled form to a client device.

In this manner, form manager 208 in computer system 210 provides a practical application of the invention for processing forms that includes automatically filling fields in forms such that the functioning of computer system 210 is improved.

The illustration of form environment 200 and the different components and dataflow in FIGS. 2-6 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, only client device 302 is shown in FIG. 3. However, form manager 208 may handle requests for forms from additional client devices in addition to or in place of client device 302. In yet other illustrative examples, form manager 208 can be located on the same computer or client device as client application 214 from which user 230 performs operations to fill form 212. In yet another illustrative example, optical character recognition engine 308 can be considered part of form manager 208 or can be a component located on client device 302. The different functions performed by form manager 208 can be distributed on more than one data processing system in computer system 210 in some illustrative examples.

With reference now to FIG. 7, an illustration of a form creation page is depicted in accordance with an illustrative embodiment. In this illustrative example, form creation page 700 is an example of one implementation for form creation page 414 shown in block form in FIG. 4. Form creation page 700 can be displayed in a graphical user interface, such as graphical user interface 406 on display system 408 for client computer 410 in FIG. 4.

As depicted, form creation page 700 shows fields for a form to add dependents. Section 702 contains fields selected through user input to enter information about a dependent. Section 704 contains fields to enter contact information. These fields can be added and removed from these sections by a user input from a user interacting with form creation page 700. For example, user input can be used to graphically move fields within regions, create new regions, and perform other operations.

Properties can be selected, entered, or both selected and entered for fields. In this example, field 706 is selected in this example. Section 708 allows a user to setup properties for section 702.

Figure 8:
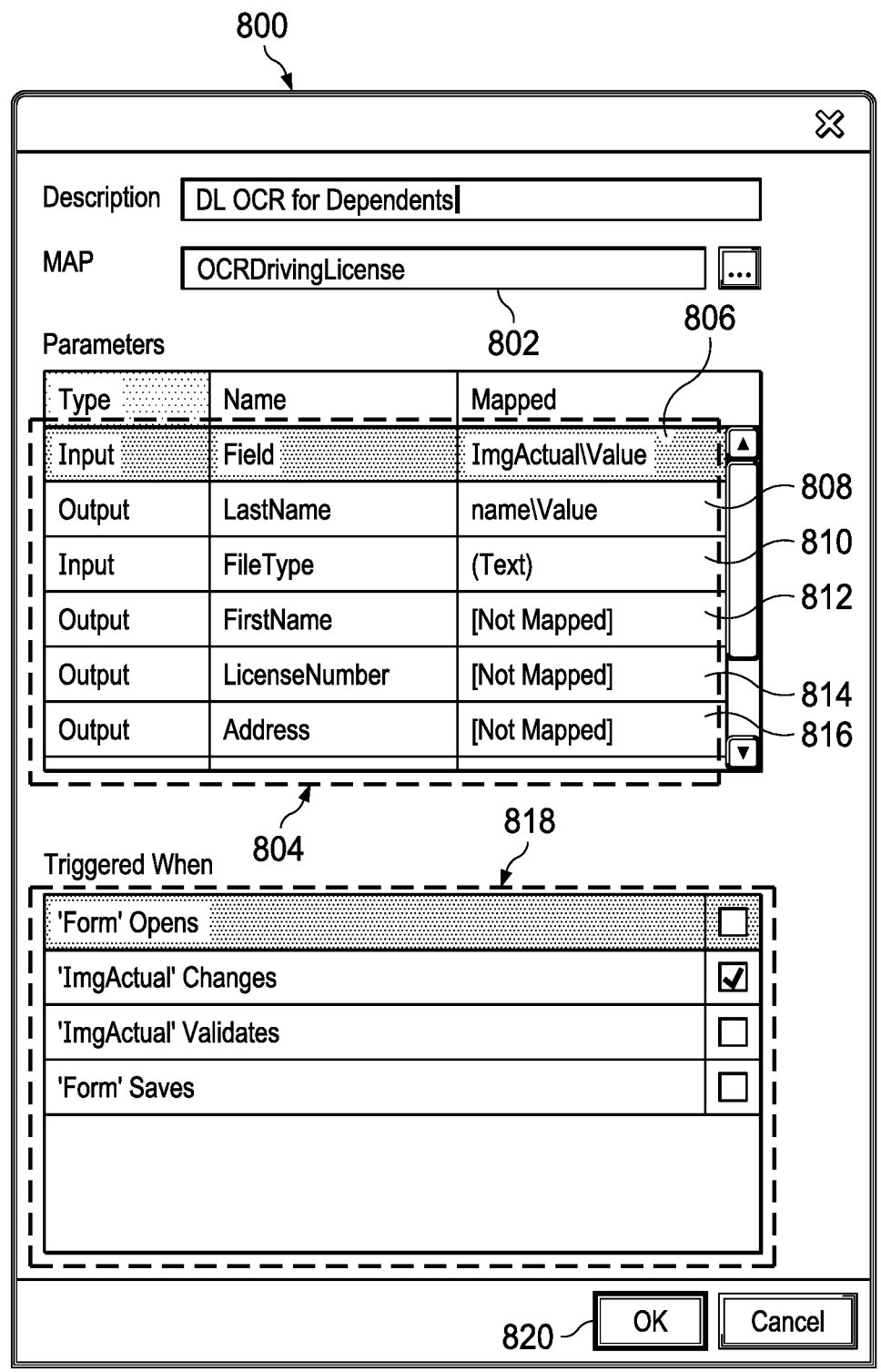
FIG. 8 is an illustration of a map creation page in accordance with an illustrative embodiment.

With reference to FIG. 8, an illustration of a map creation page is depicted in accordance with an embodiment. In this illustrative example, map creation page 800 is an example of one implementation for map creation page 430 shown in block form in FIG. 4. Map creation page 800 can be displayed in a graphical user interface, such as graphical user interface 406 on display system 408 for client computer 410 in FIG. 4.

In this illustrative example, field 802 is designed to receive user input defining the name of the map. The metadata describing the relationship between text and fields in a form can be entered through user input in section 804 of map creation page 800.

In this example, the entries include input entry 806, output entry 808, input entry 810, output entry 812, output entry 814, and output entry 816.

In this example, input entries provide information about input to the optical character recognition engine or other process. For example, input in section 804 identifies the image that is to be processed using optical character recognition.

As depicted, output entries map a label associated with text obtained from optical character recognition of an image of the documents to the name of the field in a form. This mapping is defined using map creation page 800 for a particular document type. In this example, the document type is a driver's license. For example, entry 808 has been defined such that the text with label "LastName" is placed into a field in a form in which the label is "name\Value".

As depicted, section 818 is used to determine when the map is used to map text to fields in a form. In this illustrative example, the map can be used when the form is opened, when the image changes, when an image is validated, or when the form is saved.

When the user has completed the map, the user can select okay button 820, which causes metadata entered through user input to be sent and saved.

With reference now to FIG. 9, an illustration of a form is depicted in accordance with an illustrative embodiment. As depicted, form 900 is an example of a form that can be selected for use by user 230 using client application 214 in FIG. 2. In this example, form 900 is used to add a dependent. A form manager can send a webpage, such as form 900, to a client device with a form section that has fields to receive text and a document upload section with controls to upload a document.

As depicted, form 900 includes fields in section 902 that are to be filled to add a dependent. Section 904 in form 900 allows a user to upload an image of a document for use in filling form 900. In this illustrative example, section 904 includes controls that enable a user to upload an image of a document in the form of a driver's license. The image of the driver's license can be processed using optical character recognition and a form manager, such as form manager 208 in FIG. 2, which can use the text to automatically fill a set of fields in form 900. Thus, the webpage simultaneously (at the same time) displays a form section that has the fields to receive text, such as section 902, and a document upload section with controls to upload an image of a document, such as section 904. Where section 904 includes buttons for upload and at least one of submit, clear and cancel.

Figure 10:
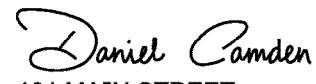
FIG. 10 is an illustration of a filled form in accordance with an illustrative embodiment.

In FIG. 10, an illustration of a filled form is depicted in accordance with an illustrative embodiment. In this illustrative example, filled form 1000 is form 900 in which field 1002 has been filled. Field 1002 is the name of the dependent.

A form manager, such as form manager 208 in FIG. 2, can fill field 1002 from text obtained from optical character recognition of image 1004 of a driver license uploaded by a user to form a filled form. The driver license is of the dependent that is to be added.

Figure 11:
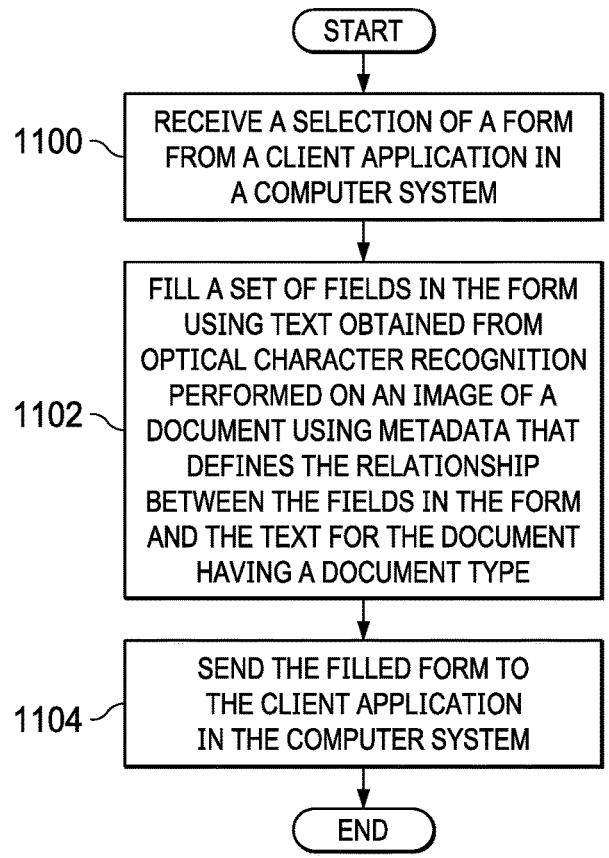
FIG. 11 is a flowchart of a process for processing a form in accordance with an illustrative embodiment.

Turning next to FIG. 11, a flowchart of a process for processing a form is depicted in accordance with an illustrative embodiment. The process in FIG. 11 can be implemented in hardware, software, or both. When implemented in software, the process can take the form of program code that is run by one of more processor units located in one or more hardware devices in one or more computer systems. For example, the process can be implemented in form manager 208 in computer system 210 in FIG. 2.

The process beings by receiving a selection of a form from a client application in a computer system (step 1100). The process fills a set of fields in the form using text obtained from optical character recognition performed on an image of a document using metadata that defines the relationship between the fields in the form and the text for the document having a document type (step 1102). In step 1102, the text for the forms can be received in raw text from the optical character recognition performed on an image. In other words, optical character recognition of the image generates text, also referred to as raw text, which can be a greater amount of text than the text that is stored in a data structure for use in filling forms. For example, raw text may include a first name, a last name, an address, a date of birth, eye color, and hair color. The text that is saved in a data structure for form filling is present in the raw text and is a subset of the raw text. For example, the text can be first name, last name, and an address.

In step 1102, the metadata defines the relationship for a particular document type. Another document type will have different metadata that defines the relationship of the fields in the form and the text. For example, one document type can have text for a first name and last name in which the metadata maps the first name and last name to fields in the form. Another document type can have text for an address. The metadata can provide mapping of the text for an address for an address field in the form.

The process sends the filled form to the client application in the computer system (step 1104). The process terminates thereafter. At this point, a user can confirm, enter text, edit text, delete text, or perform other operations with respect to the form.

Figure 12:
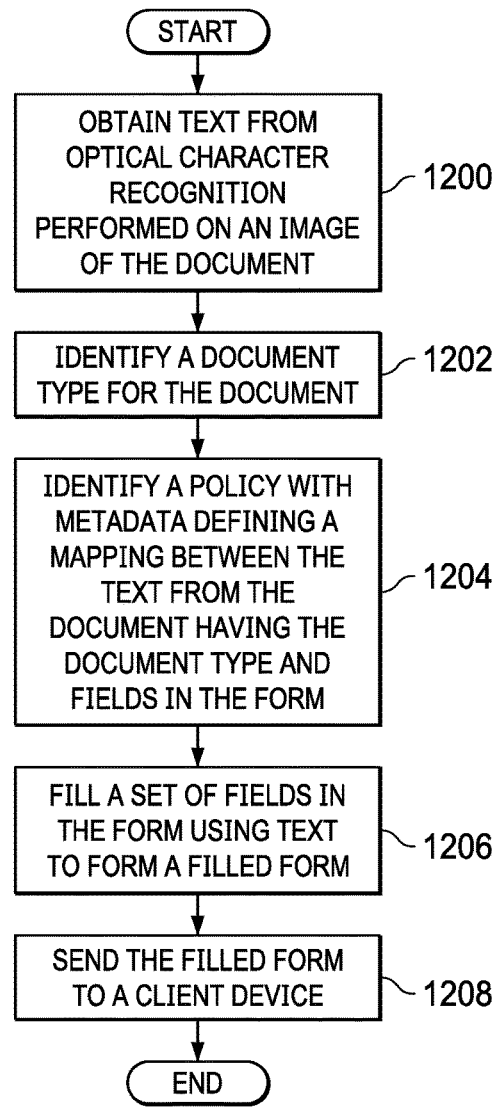
FIG. 12 is a flowchart of a process for processing a form in accordance with an illustrative embodiment.

With reference to FIG. 12, a flowchart of a process for processing a form is depicted in accordance with an illustrative embodiment. The process in FIG. 12 can be implemented in hardware, software, or both. When implemented in software, the process can take the form of program code that is run by one of more processor units located in one or more hardware devices in one or more computer systems. For example, the process can be implemented in form manager 208 in computer system 210 in FIG. 2.

The process begins by obtaining text from optical character recognition performed on an image of a document (step 1200). In this illustrative example, step 1200 can comprise receiving raw text that includes the text that will be used. The process in this step can identify text from the raw text. For example, the text received from optical character recognition can be a subset of the raw text received from this process. The subset of the raw text is stored in a data structure or other location as the text from optical character recognition that is to be used for filling fields in a form.

The process identifies a document type for the document (step 1202). The process identifies a policy with metadata defining a mapping between the text from the document having the document type and fields in the form (step 1204). The process fills a set of fields in the form using text to form a filled form (step 1206). The process sends the filled form to a client device (step 1208). The process terminates thereafter.

Figure 13:
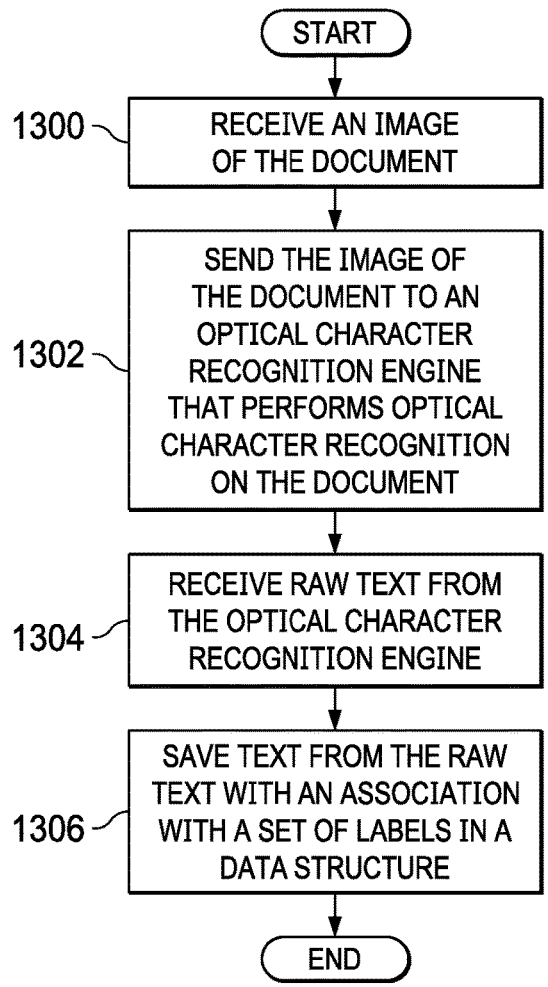
FIG. 13 is a flowchart of a process for processing a form in accordance with an illustrative embodiment.

Turning now reference to FIG. 13, a flowchart of a process for processing a form is depicted in accordance with an illustrative embodiment. The process in FIG. 13 can be implemented in hardware, software, or both. When implemented in software, the process can take the form of program code that is run by one of more processor units located in one or more hardware devices in one or more computer systems. For example, the process can be implemented in resolver 350 in form manager 208 in computer system 210 in FIG. 3.

The process begins by receiving an image of the document (step 1300). The process sends the image of the document to an optical character recognition engine that performs optical character recognition on the document (step 1302). The process receives raw text from the optical character recognition engine (step 1304). The process saves text from the raw text with an association with a set of labels in a data structure (step 1306). The process terminates thereafter. In step 1306, the labels are identified from metadata for the document type.

Figure 14:
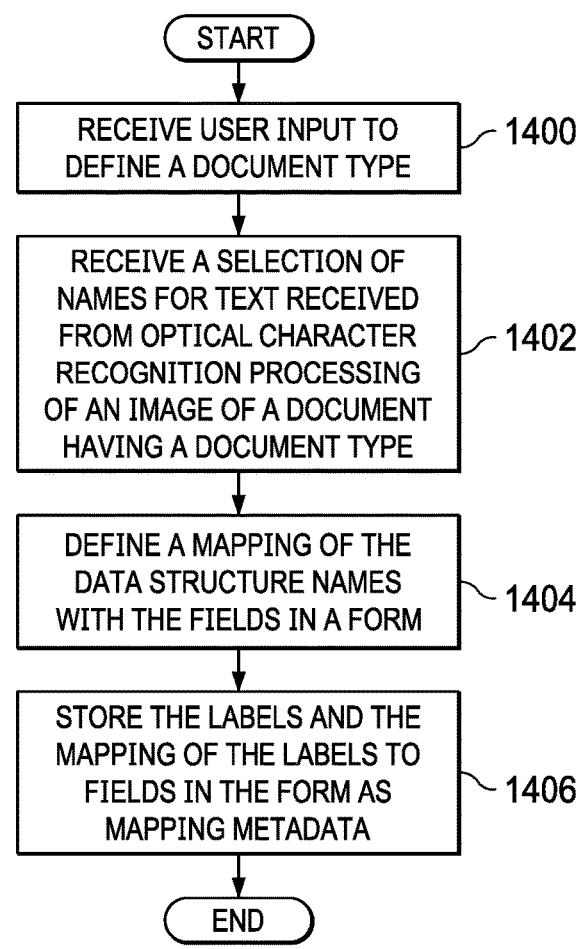
FIG. 14 is a flowchart of a process for processing a form in accordance with an illustrative embodiment.

With reference next to FIG. 14, a flowchart of a process for defining mapping metadata is depicted in accordance with an illustrative embodiment. The process in FIG. 14 can be implemented in hardware, software, or both. When implemented in software, the process can take the form of program code that is run by one of more processor units located in one or more hardware devices in one or more computer systems. For example, the process can be implemented in designer 450 in form manager 208 in computer system 210 in FIG. 4.

The process begins by receiving user input to define a document type (step 1400). In step 1400, the user input can be the name of a new document type that is to be created. The process receives a selection of names for text received from optical character recognition processing of an image of a document having a document type (step 1402). The names are labels for text that is stored in a data structure such as a JavaScript Object Notation object. The process defines a mapping of the data structure names with the fields in a form (step 1404). In this example, the form fields can be, for example, fields 216 in FIG. 2 or fields 420 in FIG. 4.

The process stores the labels and the mapping of the labels to fields in the form as mapping metadata (step 1406). The process terminates thereafter.

Figure 15:
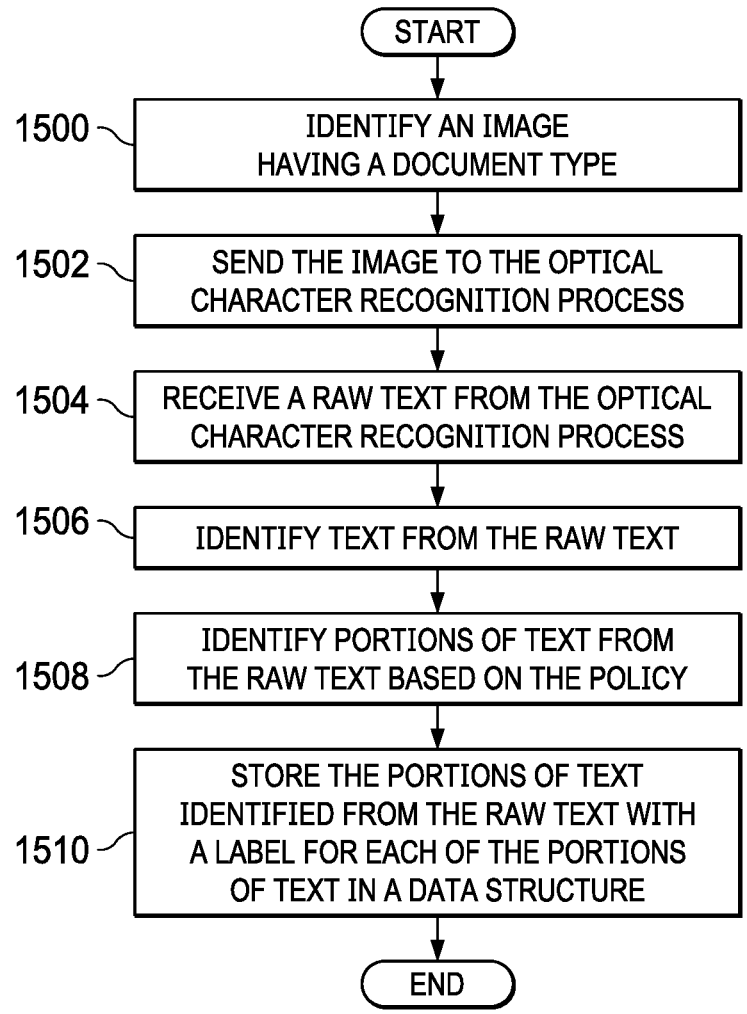
FIG. 15 is a flowchart of a process for creating a data structure to store text obtained from optical recognition being formed on an image of a document in accordance with an illustrative embodiment.

With reference next to FIG. 15, a flowchart of a process for creating a data structure to store text obtained from optical recognition being formed on an image of a document is depicted in accordance with an illustrative embodiment. The process in FIG. 15 can be implemented in hardware, software, or both. When implemented in software, the process can take the form of program code that is run by one of more processor units located in one or more hardware devices in one or more computer systems. For example, the process can be implemented in resolver 350 in form manager 208 in computer system 210 in FIG. 4.

The process begins by identifying an image having a document type (step 1500). The process sends the image to an optical character recognition process (step 1502). In the illustrative examples, the optical character recognition process is an optical character recognition. After, the illustrative examples can send the image to a process that employs optical character recognition techniques to obtain text from images. In step 1502, the image can be sent by sending a file with the image or by sending a pointer or link to the image.

The process receives raw text from the optical character recognition process (step 1504). The process identifies text from the raw text (step 1506). The text identified can be some or all raw text. This notification can be made based on a text selection policy, such as text selection policy 223 in FIG. 3. The text selection policy contains one or more rules that define what text is needed from the raw text. The policy is based on document types in this example. The text defined by the policy can be portions of raw text that correspond to labels in metadata such as name 618 and output entry 612 for mapping metadata 600.

For example, if a name in the metadata is "address", the portion of raw text that contains an "address" can be corresponding to the label "address". The identification of raw text considered to be an "address" can be defined in a number of different ways. For example, the identification can be defined based on a region in the image, unique text preceding or located subsequent to the raw text for "address", or through other techniques.

The process identifies portions of text from the raw text based on the policy (step 1508). The process stores the portions of text identified from the raw text in with a label for each of the portions of text in a data structure (step 1510). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
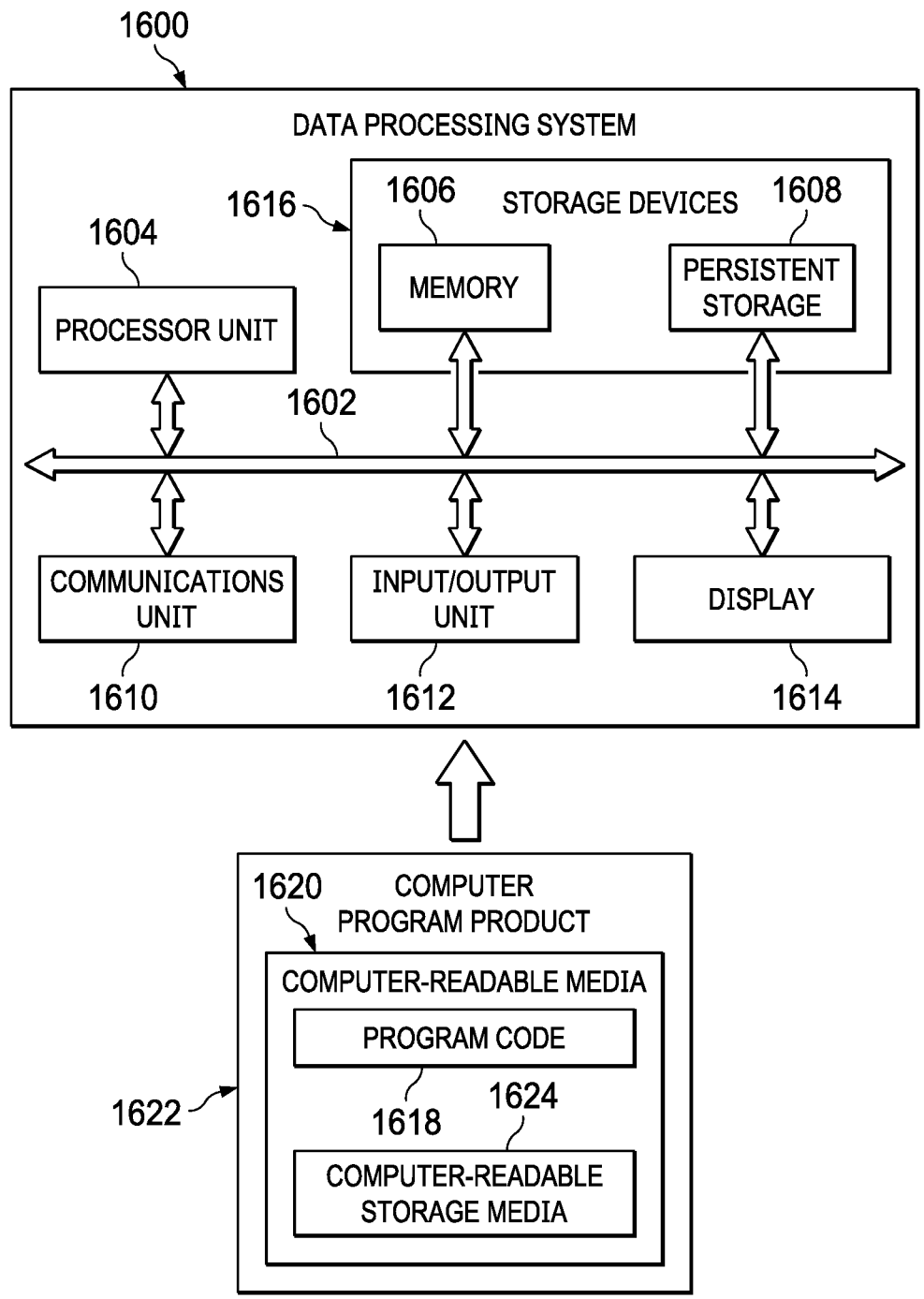
FIG. 16 is a block diagram of a data processing system in accordance with an illustrative embodiment.

Turning now to FIG. 16, a block diagram of a data processing system is depicted in accordance with an illustrative embodiment. Data processing system 1600 can be used to implement server computer 104, server computer 106, client devices 110, in FIG. 1. Data processing system 1600 can also be used to implement computer system 210 in FIG. 2, client device 302 in FIG. 3, and client computer 410 in FIG. 4. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1702 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device.

Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program code, computer usable program code, or computer-readable program code that can be read and executed by a processor in processor unit 1604. The program code in the different embodiments can be embodied on different physical or computer-readable storage media, such as memory 1606 or persistent storage 1608.

Program code 1618 is located in a functional form on computer-readable media 1620 that is selectively removable and can be loaded onto or transferred to data processing system 1600 for execution by processor unit 1604. Program code 1618 and computer-readable media 1620 form computer program product 1622 in these illustrative examples. In the illustrative example, computer-readable media 1620 is computer-readable storage media 16724.

In these illustrative examples, computer-readable storage media 1624 is a physical or tangible storage device used to store program code 1618 rather than a medium that propagates or transmits program code 1618.

Alternatively, program code 1618 can be transferred to data processing system 1600 using a computer-readable signal media. The computer-readable signal media can be, for example, a propagated data signal containing program code 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1600 are not meant to provide architectural limitations to the manner in which different embodiments can be implemented. The different illustrative embodiments can be implemented in a data processing system including components in addition to or in place of those illustrated for data processing system 1700. Other components shown in FIG. 16 can be varied from the illustrative examples shown. The different embodiments can be implemented using any hardware device or system capable of running program code 1618.

Thus, the illustrative examples provide a method, an apparatus, a system, and computer program product for processing forms. In one illustrative example, a method processes a form. A selection of a form is received from a client application in a computer system. A set of fields in the form is filled using text obtained from optical character recognition performed on an image of a document using metadata that defines a relationship between a set of fields in the form and the text for the document having the document type. The filled form is sent to the client application in the computer system.

The illustrative examples avoid having to define where data in each document goes in a particular form through hard coding where the data from a particular type of document goes in a particular type of form. The present disclosure uses metadata to describe relationships between information in different types of documents with a form. The relationship can be defined through a selection of mappings of information obtained from the document with the fields in the form.

The form manager can be used to obtain text from optical recognition performed on a document adding a particular document type. The text is saved in a data structure such as a flat file, a linked list, a JavaScript Object Notation object, or other suitable data structure. As depicted, maps can be defined for each form and document type that may be used. A map is metadata that defines the relationship between a selected form and a particular document type. The metadata states what piece of information in a data structure generated by a resolver goes into a particular field in the form. The maps can be easily changed when a form changes. New forms can be easily added by creating new maps. These maps are used to fill one or more fields in a form to form a filled form.

In the illustrative example, the form manager sends a filled form for display to a user at a client device. As depicted, a browser displays the filled form with the set of fields that have been automatically filled with text. The user can verify and correct text in filled fields and enter text in any blank fields. When the user is finished, the completed form is returned to the form manager for further processing. The processing can include at least one of adding text, reading text, deleting text, modifying text, or other suitable operations, actions, or steps that use the text filled in the completed form. Thus, operations that involve filling forms can be performed more easily using a form manager in accordance with an illustrative embodiment.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 1606, or portions thereof, may be incorporated in processor unit 1604 in some illustrative examples. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A form processing system comprising:
   a computer system;
   a form database in the computer system, wherein the form database includes a plurality of forms with fields;
   a policy, wherein the policy includes maps that comprise mapping metadata defining-relationships between the fields in the plurality of forms and text from documents based on document types for the documents;
   a form manager in the computer system, wherein the form manager:

receives a selection of a form of the plurality of forms in the form database from a client device over a network;

sends a webpage to the client device that simultaneously displays a form section that has fields to receive text and a document upload section with a plurality of controls to upload an image of a document;

receives the image of the document, wherein the document has a document type;

sends the image of the document to an optical character recognition engine;

receives text from the optical character recognition engine;

identifies the document type of the document;

identifies the policy including a map in the maps, the map comprises mapping metadata defining a relationship between the received text from the document having the document type and a set of the fields in the form;

stores the received text in a data structure based on the document type for the document;

fills the set of the fields in the form using selected text from the received text stored in the data structure and using the map comprising the mapping metadata, the mapping metadata comprising a rule including logic that defines the relationship between the set of the fields in the form and the received text to create a filled form, wherein the mapping metadata further comprises a trigger which describes when the mapping metadata is to be used; and sends the filled form to the client device over the network; and a designer in the form manager that receives a user input generated from a map creation page selecting the form, the document type for the document, and a mapping between the text for the document having the document type and the set of the fields in the form and stores the mapping between the text for the document type and the set of the fields in the form as the mapping metadata in the map included in the policy for the document type, wherein the map includes the mapping metadata defining the relationship between the received text from the document having the document type and the set of the fields in the form.

2. The form processing system of claim 1 further comprising:

prior to the form manager receiving the selection of the form of the plurality of forms in the form database from the client device, the designer in the form manager that receives a user input generated from a form creation page defining the set of the fields in the form and an arrangement of the set of the fields and stores the set of the fields and the arrangement of the set of the fields as form metadata in the form database.

3. The form processing system of claim 1 further comprising:

a resolver in the form manager that stores text from documents in data structures based on document types for the documents, wherein the text is from optical character recognition processing of images of the documents.

4. The form processing system of claim 1, wherein a browser in the client device receives the filled form and simultaneously displays the filled form and the image of the document in the browser on a display system in the client device.

5. The form processing system of claim 1, wherein a browser in the client device receives the filled form and displays the filled form in the browser on a display system in the client device.

6. The form processing system of claim 1, wherein the form manager receives a completed form from the client device over the network.

7. The form processing system of claim 1, wherein the document type is one of a driver's license, a passport, a social security card, a birth certificate, an expense report, an employment application, and a Form W-2.

8. The form processing system of claim 1, wherein the data structure is one of a table, a database, a flat file, and a linked list.

9. A form processing system comprising:

a computer system;

a form database in the computer system, wherein the form database includes a plurality of forms with fields; and a form manager in the computer system, wherein the form manager:

receives a selection of a form in the form database from a client application in the computer system;

sends a webpage to the client application that simultaneously displays a form section that has fields to receive text and a document upload section with a plurality of controls to upload an image of a document;

sends the image of the document to an optical character recognition engine;

receives the text from the optical character recognition engine;

obtains text from optical character recognition performed on the image of the document;

identifies a document type of the document;

identifies a policy including a map, the map comprises mapping metadata defining a relationship between the text from the document having the document type and a set of fields in the form;

fills the set of fields in the form to form a filled form using selected text from the text obtained from optical character recognition performed on the image of the document using the map comprising the mapping metadata, the mapping metadata comprising a rule including logic that defines the relationship between the set of fields in the form and the text for the document type of the document wherein the mapping metadata further comprises a trigger which describes when the mapping metadata is to be used; and sends the filled form to the client application in the computer system; and a designer in the form manager that receives a user input generated from a map creation page selecting the form, the document type for the document, and a mapping between the text for the document having the document type and the set of fields in the form and stores the mapping between the text for the document type and the set of fields in the form as the mapping metadata in the map included in the policy for the document type, wherein the map includes the mapping metadata defining the relationship between the received text from the document having the document type and the set of fields in the form.

10. The form processing system of claim 9, wherein the form manager sends the image of the document to an optical character recognition engine and receives the text from the optical character recognition engine through a resolver that uses the policy that includes the mapping metadata that defines the relationship between the text to the set of fields in the form and fills the set of fields in the form using the text.

11. The form processing system of claim 9, wherein in sending the filled form to the client application in the computer system, the form manager sends the filled form to the client application on a client device over a network in the computer system.

12. The form processing system of claim 9, wherein the form manager and the client application are on a same data processing system in the computer system.

13. The form processing system of claim 9, wherein the client application is a browser.

14. The form processing system of claim 9, wherein the form manager receives a completed form from the client application on a client device over a network.

15. The form processing system of claim 9, wherein the document type is one of a driver's license, a passport, a social security card, a birth certificate, an expense report, an employment application, and a Form W-2.

16. A method for processing a form, the method comprising:
receiving a user input generated from a map creation page selecting the form, a document type for a document, and a mapping between text for the document having the document type and a set of fields in the form;
storing the mapping between the text for the document having the document type and the set of fields in the form as mapping metadata in a map included in a policy for the document type, wherein the map includes the mapping metadata defining a relationship between the text from the document having the document type and the set of fields in the form;
identifying the form for processing from a form database that includes a plurality of forms with fields;
sending a webpage to a client device that simultaneously displays a form section that has fields to receive the text and a document upload section with a plurality of controls to upload an image of the document;
receiving the image of the document;
sending the image of the document to an optical character recognition engine that performs optical character recognition on the document;
obtaining text from the optical character recognition performed on the image of the document;
identifying the document type for the document;
identifying the policy with the mapping metadata, the mapping metadata comprising a rule including logic defining the relationship between the text from the document having the document type and the set of fields in the form, wherein the mapping metadata further comprises a trigger which describes when the mapping metadata is to be used;
filling the set of fields in the form using the text and the mapping metadata that defines the relationship between the set of fields in the form and the text to form a filled form; and
sending the filled form to the client device.

17. The method of claim 16 further comprising:
receiving a user input selecting the form, a document type for the form, and a mapping between the text for the document type and the set of fields in the form; and
storing the mapping between the text for the document type and the set of fields in the form as the mapping metadata for the document type.

18. The method of claim 16 further comprising:
receiving a user input defining the set of fields in the form and an arrangement of the set of fields; and
storing the set of fields and the arrangement of the set of fields as form metadata.

19. The method of claim 16, wherein a browser in the client device receives the filled form and displays the filled form and the image of the document in the browser on a display system in the client device.

20. The method of claim 16, wherein a browser in the client device receives the filled form and displays the filled form in the browser on a display system in the client device.

21. The method of claim 16 further comprising:
receiving a completed form from the client device.

22. The method of claim 16, wherein the document type is one of a driver license, a passport, an expense report, an employment application, and a Form W-2.

23. A method for processing a form, the method comprising:
receiving a user input generated from a map creation page selecting the form, a document type for a document, and a mapping between text for the document having the document type and a set of fields in the form;
storing the mapping between the text for the document having the document type and the set of fields in the form as mapping metadata in a map included in a policy for the document type, wherein the map includes the mapping metadata defining a relationship between the text from the document having the document type and the set of fields in the form;
receiving a selection of form for processing from a form database that includes a plurality of forms with fields from a client application in a computer system;
sending a webpage to the client application that simultaneously displays a form section that has fields to receive text and a document upload section with a plurality of controls to upload an image of the document having the document type;
receiving the image of the document;
sending the image of the document to an optical character recognition engine that performs optical character recognition on the document;
obtaining text from the optical character recognition performed on the image of the document;
identifying the document type of the document;
identifying the policy with the mapping metadata, the mapping metadata comprising a rule including logic defining the relationship between the text from the document having the document type and the set of fields in the form, wherein the mapping metadata further comprises a trigger which describes when the mapping metadata is to be used;
filling the set of fields in the form using text obtained from optical character recognition performed on the image of the document using metadata that defines the relationship between the set of fields in the form and the text for the document having the document type; and
sending the filled form to the client application in the computer system.

24. A computer program product for processing a form, the computer program product comprising:
a computer-readable storage media;
first program code, stored on the computer-readable storage media, for receiving a user input generated from a map creation page selecting the form, a document type for the form, and a mapping between text for a document having the document type and a set of fields in the form; and second program code, stored on the computer-readable storage media, for storing the mapping between the text for the document having the document type and the set of fields in the form as mapping metadata in a map included in a policy for the document type, wherein the map includes the mapping metadata defining a relationship between the text from the document having the document type and the set of fields in the form;

third program code, stored on the computer-readable storage media, for identifying the form for processing from a form database that includes a plurality of forms with fields;

fourth program code, stored on the computer-readable storage media, for obtaining text from optical character recognition performed on an image of the document;

fifth program code, stored on the computer-readable storage media, for identifying the document type for the document;

sixth program code, stored on the computer-readable storage media, for identifying the policy with the mapping metadata, the mapping metadata comprising a rule including logic defining the relationship between the text from the document having the document type and the set of fields in the form, wherein the mapping metadata further comprises a trigger which describes when the mapping metadata is to be used;

seventh program code, stored on the computer-readable storage media, for filling the set of fields in the form using the text and the mapping metadata that defines the relationship between the set of fields in the form and the text to form a filled form;

eighth program code, stored on the computer-readable storage media, for sending the filled form to a client device;

ninth program code, stored on the computer-readable storage media, for sending a webpage to the client device that simultaneously displays a form section that has fields to receive the text and a document upload section with a plurality of controls to upload the image of the document;

tenth program code, stored on the computer-readable storage media, for receiving the image of the document; and eleventh program code, stored on the computer-readable storage media, for sending the image of the document to an optical character recognition engine that performs optical character recognition on the document.

25. The method of claim 23 further comprising:
receiving a completed form from the client application on a client device.

26. The method of claim 23, wherein the document type is one of a driver's license, a passport, a social security card, a birth certificate, an expense report, an employment application, and a Form W-2.

27. The computer program product of claim 24 further comprising:
twelfth program code, stored on the computer-readable storage media, for receiving a user input defining the set of fields in the form and an arrangement of the set of fields; and thirteenth program code, stored on the computer-readable storage media, for storing the set of fields and the arrangement of the set of fields as form metadata.

28. The computer program product of claim 24, wherein a browser in the client device receives the filled form and displays the filled form and the image of the document in the browser on a display system in the client device.

29. The computer program product of claim 24, wherein the document type is one of a driver's license, a passport, a social security card, a birth certificate, an expense report, an employment application, and a Form W-2.

* * * * *